United States Patent [19]

Kwak

[11] Patent Number: 5,191,355
[45] Date of Patent: Mar. 2, 1993

[54] DEVICE FOR ADJUSTING THE HEAT-GENERATING TIME OF A THERMAL PRINTER HEAD

[75] Inventor: Doo-Shin Kwak, Seoul, Rep. of Korea

[73] Assignee: Samsung Electronics Co., Ltd., Suwon, Rep. of Korea

[21] Appl. No.: 446,876

[22] Filed: Dec. 6, 1989

[30] Foreign Application Priority Data

Jun. 29, 1989 [KR] Rep. of Korea ............... 9078/1989

[51] Int. Cl.⁵ .......................... G01D 9/00; B41J 2/355
[52] U.S. Cl. ........................... 346/76 PH; 346/11.1; 400/120
[58] Field of Search .............. 346/70 PH, 1.1; 400/120; 346/1.1

[56] References Cited

U.S. PATENT DOCUMENTS

| | | | |
|---|---|---|---|
| 4,535,340 | 8/1985 | Moriguchi et al. | 346/76 PH |
| 5,019,836 | 5/1991 | Iwata et al. | 346/76 PH |
| 5,046,859 | 9/1991 | Yamaguchi | 346/76 PH |

FOREIGN PATENT DOCUMENTS

| | | | |
|---|---|---|---|
| 0147384 | 9/1983 | Japan | 400/120 |
| 013620 | 8/1984 | Japan | 400/120 |
| 0054870 | 3/1985 | Japan | 346/76 PH |
| 0053064 | 3/1986 | Japan | 400/120 |
| 0161565 | 7/1987 | Japan | 346/76 PH |

Primary Examiner—Benjamin R. Fuller
Assistant Examiner—Huan Tran
Attorney, Agent, or Firm—Robert E. Bushnell

[57] ABSTRACT

There is disclosed a device for flexibly adjusting the strobe pulse width corresponding to the heat-generating resistance grade of a thermal printer head through a DIP switch. The DIP switch generates a number of states of voltages corresponding to the grade number of the heat-generating resistance of the thermal printer head. The DIP switch keeps voltage suited for the heat-generating resistance grade of the thermal printer head to supply it to a CPU.

10 Claims, 1 Drawing Sheet

DEVICE FOR ADJUSTING THE HEAT-GENERATING TIME OF A THERMAL PRINTER HEAD

BACKGROUND OF THE INVENTION

The present invention relates to a driver for a thermal printer head and more particularly, to a device for adjusting heat-generating time of the thermal printer head (hereinafter referred to as TPH),for example,to be used in facsimile apparatus.

A thermal printing head used for printing in a facsimile system prints according to the duration of strobe pulse applied. Conventionally, a TPH driving voltage supplied by a power supply is adjusted to a heat-resistance grade of the TPH. Namely, in order to adjust the TPH driving voltage to the heat-generating resistance grade of the TPH, the power supply level is manually adjusted by using a variable resistor of the power supply. By this known art, when the TPH being used in the system is replaced with another one, the power supply must be disassembled to readjust the variable resistor to the heat-generating resistance grade of the substituted TPH, and this causes complication of maintenance and repair of the system.

SUMMARY OF THE INVENTION

An object of the present invention is to provide a device for efficiently adjusting the heat-generation time for a thermal printer head by adjusting the duration of a strobe pulse to a given heat-generating resistance grade of the thermal printer head, by means of a dual-in-line package (DIP) switch, mainly for use in a facsimile apparatus.

According to one aspect of the present invention, a device for flexibly adjusting the heat-generating time of the thermal printer head of a facsimile system includes a voltage-fixing type thermal printer head, a memory for storing the information relating to a plurality of heat-generating resistances and relating to the strobe pulse width corresponding to the values of the heat-generating resistances of the thermal printer head, a central processing unit CPU for sending the strobe pulse suited to the thermal printer head by dividing the frequency of the pulses from a driving clock pulse generator according to the strobe pulse width, a DIP switch for generating a plurality of signals corresponding to the heat-generating resistance of the thermal printer head, and an input/output (I/O) buffer for accumulating the information of the DIP switch and sending the information to the CPU.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
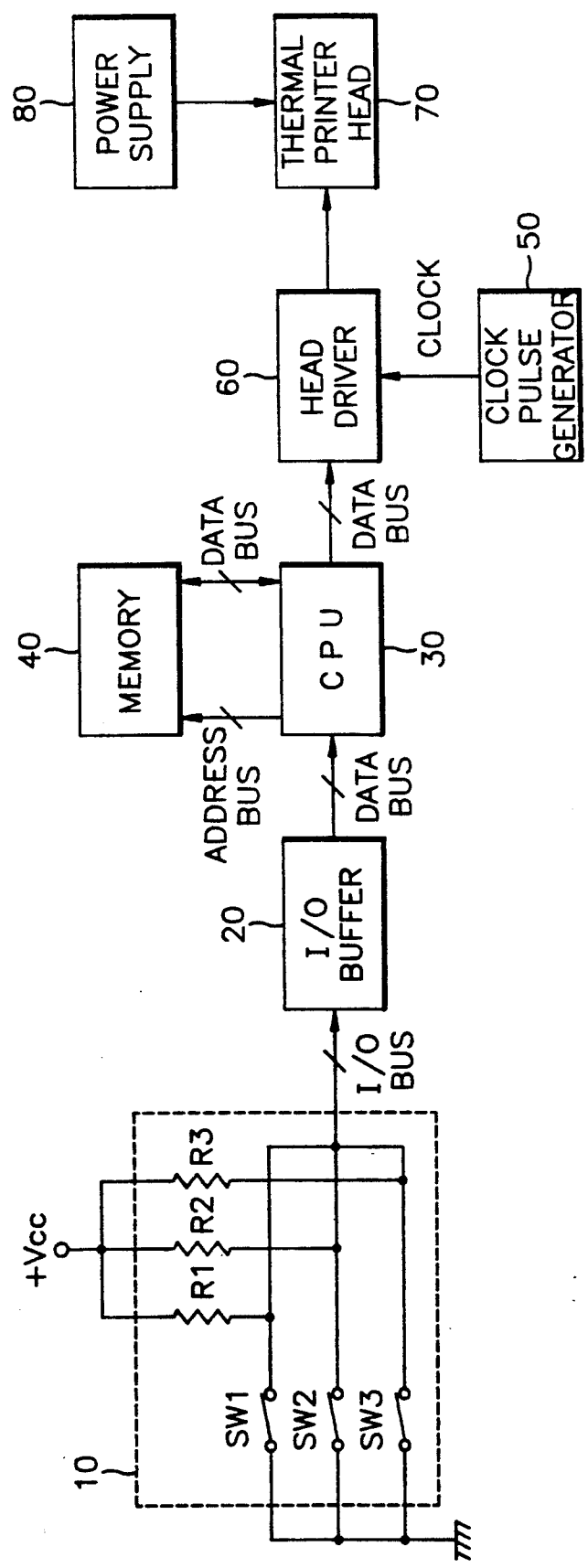
FIG. 1 is a schematic diagram of the inventive circuit.

The present invention will now be described more specifically with reference to the drawing attached only by way of example.

Referring to FIG. 1, DIP switch includes switches SW1-SW3 and pull-up resistors R1-R3 in order to generate a signal for determining the strobe pulse width corresponding to the heat-generating resistance grade of thermal printer head 70. The I/O buffer 20 buffers the output of the DIP switch 10. Memory 40 stores the system program and the various values of the heat-generating resistances for the various thermal printer heads. The (CPU) 30 for controlling the system controls the memory 40 to output the data relating to the strobe pulse width of the thermal printer head 70 according to the output of the I/O buffer 20. Head driver 60 generates the strobe pulse for driving the thermal printer head 70. Head driver 60 divides the frequency of the pulses from the driving clock pulse generator 50 according to the strobe pulse width of the thermal printer head 70. The thermal printer head 70 prints the data to be printed according to the strobe pulse of the head driver 60. Power supply 80 supplies power to the thermal printer head 70.

When using a voltage-fixing type thermal printer head, the strobe pulse needs to have its own pulse width suited to the thermal printer head as shown in Table 1 corresponding to the heat-generating resistance grade of the thermal printer head.

TABLE 1

| heat-generation resistance (ohms) | strobe pulse width ($\mu$sec) |
|---|---|
| 2380–2459 | 1.52 |
| 2460–2545 | 1.57 |
| 2546–2637 | 1.63 |
| 2638–2736 | 1.68 |
| 2737–2843 | 1.75 |
| 2844–2958 | 1.81 |
| 2959–3083 | 1.89 |
| 3084–3220 | 1.96 |

The strobe pulse width of Table 1 is obtained under 25° C., and varies with the temperature.

The voltage fixing type TPH should satisfy one of the heat-generation resistance values in Table 1. Hence, in order to adjust the strobe pulse width to the heat-generating resistance grades of TPH 70, the CPU 30 should give the data relating to the strobe pulse width of TPH 70 corresponding to the heat-generating resistance grade of TPH to the head driver 60. The DIP switch 10 is used to present the information relating to the heat-generating resistance grade of TPH in I/O buffer 20 as described above. Namely, a combination of the switches SW1-SW3 provides the eight switching signals with the I/O buffer, which accumulates the information of one of the eight switching signals and sends it to the CPU 30. The CPU 30 compares it with the data stored in the memory 40 which has the data relating to the heat-generating resistance values of TPH and the strobe pulse widths corresponding thereto. Consequently, the CPU 30 analyzes the data from the I/O buffer 20 and the data in the memory 40 to produce the data for setting the strobe pulse width of TPH 70.

Meanwhile, the head driver 60 divides the frequency of the clock pulses from the driving clock pulse generator 50 according to the data for setting the strobe pulse width, so as to produce a strobe pulse whose width is suited for TPH 70. Then, the TPH 70 prints the data to be printed during the duration of the strobe pulse. When the values of heat-generating resistance are as shown in Table 1, every possible combination of the DIP switch is as shown in Table 2.

TABLE 2

| DIP switch | heat-generating resistance (ohms) | | | | | | | |
|---|---|---|---|---|---|---|---|---|
| | 2380–2459 | 2460–2545 | 2546–2637 | 2638–2736 | 2737–2843 | 2959–2958 | 2959–3025 | 3024–3220 |
| SW1 | OFF | OFF | OFF | OFF | ON | ON | ON | ON |
| SW2 | OFF | OFF | ON | ON | OFF | OFF | ON | ON |
| SW3 | OFF | ON | OFF | ON | OFF | ON | OFF | ON |

Thus, the DIP switch 10 is set to one of the eight switching values as shown in Table 2 corresponding to the heat-generating resistance grade of the TPH 70, and the CPU 30 reads the data relating to the strobe pulse width corresponding to the heat-generating resistance grade from the memory 40, according to the state of the DIP switch 10. The head driver 60 divides the frequency of the pulses of the clock pulse generator according to the strobe pulse width so as to produce a strobe pulse for driving the TPH 70 suited to the heat-generation resistance grade.

As described above, the inventive circuit may easily adjust the strobe pulse width to the heat-generating resistance grade of a voltage fixing type thermal printer head by means of a DIP switch, thereby flexibly adjusting the heat-generating time of the TPH with ease and simplifying the maintenance and repair of the system even when the TPH is replaced.

Although specific constructions and procedures of the invention have been illustrated and described herein, it is not intended that the invention be limited to the elements and construction disclosed. One skilled in the art will easily recognize that the particular elements or subconstructions may be used without departing from the scope and spirit of the invention.

What is claimed is:

1. A circuit for adjusting heat-generation time of a thermal printer head, comprising:
   memory means for storing information relating to a plurality of heat-generating resistances for said thermal printer head and relating to a plurality of corresponding strobe pulse widths for said thermal printer head;
   switching means for selectively enabling and maintaining variable manual selection of switching signals for selected ones of a plurality of values corresponding to said heat-generating resistances of said thermal printer head;
   control means for generating strobe pulse data by determining a selected strobe pulse width suited to said thermal printer head in dependence upon said switching signals and said information;
   input/output buffering means interposed between said switching means and said control means, for accumulating said switching signals to provide accumulated signals to said control means; and
   driving means for driving the thermal printer head in dependence upon said strobe pulse data.

2. The circuit of claim 1, wherein said thermal printer head is a voltage fixing type thermal printer head.

3. The circuit of claim 1, wherein said switching means comprises:
   first terminal means for receiving a first potential;
   second terminal means for receiving a second potential;
   a first plurality of switches individually coupled between one of said first and second terminal means and corresponding ones of a plurality of nodes formed by said plurality of switches; and
   means coupled between another of said first and second terminal means and corresponding ones of said plurality of nodes, for providing said switching signals in dependence upon states of said plurality of switches.

4. The circuit of claim 1, wherein said switching means comprises:
   first terminal means for receiving a first potential;
   second terminal means for receiving a second potential;
   a plurality of switches individually coupled between one of said first and second terminal means and corresponding ones of a plurality of nodes formed by said plurality of switches;
   means coupled between another of said first and second terminal means and corresponding ones of said plurality of nodes, for providing said switching signals in dependence upon states of said plurality of switches; and
   a bus coupled between said plurality of nodes and said input/output buffering means, for providing said switching signals in dependence upon states of said plurality of switches.

5. A circuit for adjusting heat-generating time of a thermal printer head, comprising:
   memory means for storing information about a plurality of values for a plurality of heat-generating resistances of the thermal printer head, said values relating to a plurality of corresponding strobe pulse widths for the thermal printer head;
   switching means for enabling and maintaining variable manual selection of switching signals for selected ones of a plurality of values related to said heat-generating resistances;
   control means for generating strobe pulse data by determining said strobe pulse widths for the thermal printer head in dependence upon said switching signals and said information; and
   driving means for driving said thermal printer head in dependence upon said strobe pulse data, comprising:
   clock pulse generator means for generating clock pulses of a predetermined frequency; and
   head driver means for dividing said clock pulses in response to said strobe pulse data to generate a strobe pulse of a desired width.

6. The circuit of claim 5, wherein said thermal printer head is a voltage fixing type thermal printer head.

7. The circuit of claim 5, wherein said switching means comprises:
   first terminal means for receiving a first potential;
   second terminal means for receiving a second potential;
   a first plurality of switches individually coupled between one of said first and second terminal means and corresponding ones of a plurality of nodes formed by said plurality of switches; and
   means coupled between another of said first and second terminal means and corresponding ones of said plurality of nodes, for providing said switching signals in dependence upon states of said plurality of switches.

8. The circuit of claim 5, wherein said switching means comprises:
first terminal means for receiving a first potential;
second terminal means for receiving a second potential;
a plurality of switches individually coupled between one of sad first and second terminal means and corresponding ones of a plurality of nodes formed by said plurality of switches;
means coupled between another of sad first and second terminal means and corresponding ones of said plurality of nodes, for providing said switching signals in dependence upon states of said plurality of switches; and
a bus coupled between said plurality of nodes and an input/output buffer, for providing said switching signals in dependence upon states of said plurality of switches.

9. A process for adjusting head-generation time of a thermal printer head, comprising the steps of:

storing information relating to a plurality of heat-generating resistances for the thermal printer head and relating to strobe pulse widths for the thermal printer head;
selectively providing switching signals for making a selection of selected ones of a plurality of values related to said head-generating resistances;
generating strobe pulse data by determining said strobe pulse widths for the thermal printer head in dependence upon said switching signals and sad information;
generating clock pulses having a predetermined frequency;
dividing sad clock pulses in response to said strobe pulse data to generate a driving pulse having a desired width; and
driving said thermal printer head in response to said driving pulse.

10. The process of claim 9, further comprised of:
accumulating said switching signals and transmitting the accumulated signals prior to generating said strobe pulse data.

* * * * *

UNITED STATES PATENT AND TRADEMARK OFFICE
CERTIFICATE OF CORRECTION

PATENT NO. : 5,191,355
DATED : 2 March 1993
INVENTOR(S) : Doo-Shin Kwak It is certified that error appears in the above-identified patent and that said Letters Patent is hereby corrected as shown below:

| | | | |
|---|---|---|---|
| Claim 5, | Column 4, | Line 48, | insert --said driving means-- after ","; |
| Claim 8, | Column 5, | Line 9, | change "sad" to --said--; |
| Claim 8, | Column 5, | Line 12, | change "sad" to --said--; |
| Claim 9, | Column 6, | Line 10, | change "sad" to --said--; |
| Claim 9, | Column 6, | Line 14, | change "sad" to --said--. |

Signed and Sealed this

Twenty-first Day of June, 1994

Attest:

BRUCE LEHMAN

*Attesting Officer*   *Commissioner of Patents and Trademarks*